Feb. 8, 1966  SHIZUO NAKAMURA  3,233,562
MOULDING PROCESS FOR FOODSTUFFS
Filed July 10, 1962

2 Sheets-Sheet 1

INVENTOR.
SHIZUO NAKAMURA
BY
ATTORNEYS

Feb. 8, 1966 SHIZUO NAKAMURA 3,233,562
MOULDING PROCESS FOR FOODSTUFFS
Filed July 10, 1962
2 Sheets-Sheet 2
Fig. 6
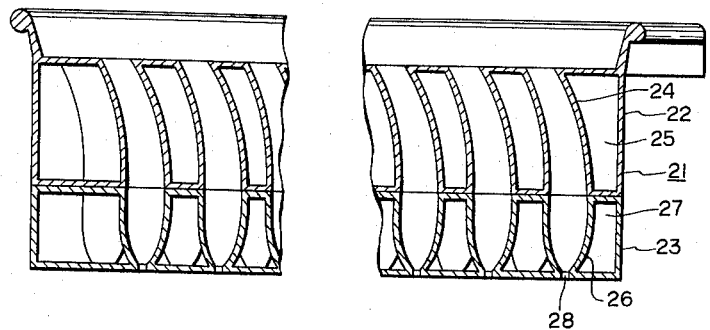
Fig. 7
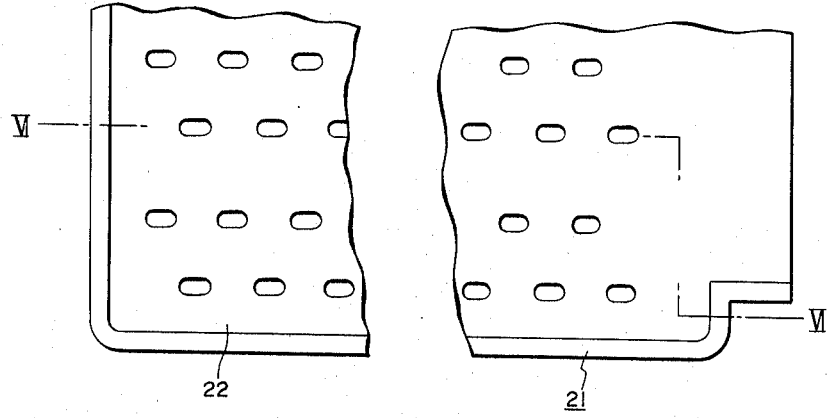
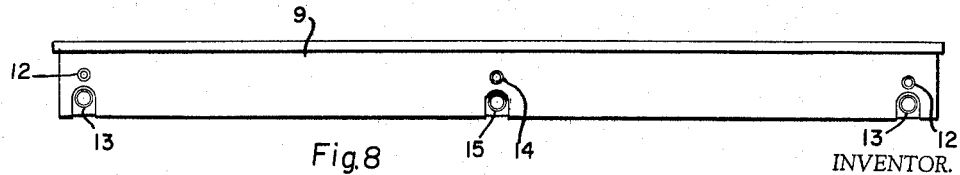
Fig. 8
INVENTOR.
SHIZUO NAKAMURA
BY
ATTORNEYS 3,233,562
MOULDING PROCESS FOR FOODSTUFFS
Shizuo Nakamura, 118 Mineokamachi 2-chome,
Hodogaya-ku, Yokohama, Japan
Filed July 10, 1962, Ser. No. 208,788
3 Claims. (Cl. 107—54)

The present invention relates to an improvement in and relating to a moulding process for foodstuffs, such as ice-cream, sherbet, chocolate and the like, of the type formed by putting fluid material in a mould and then cooling said material by a refrigerating medium to any suitable form.

Particularly, the object of this inevntion is to provide a process for producing a large quantity of so-called moulded ice-cream having shapes imitating, for instance, animals, man, fruits or utensils, with remarkable ease.

Figure 2:
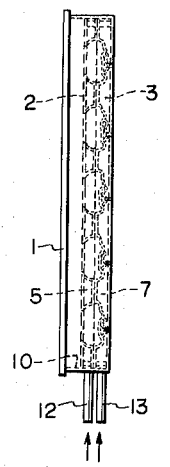
Figure 1:
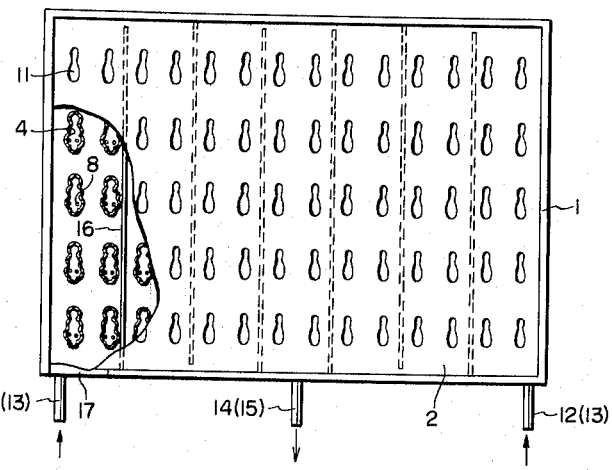
Figure 3:
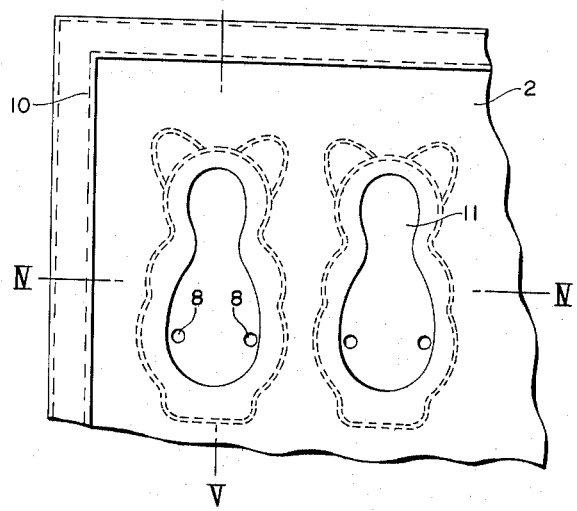
Figure 5:
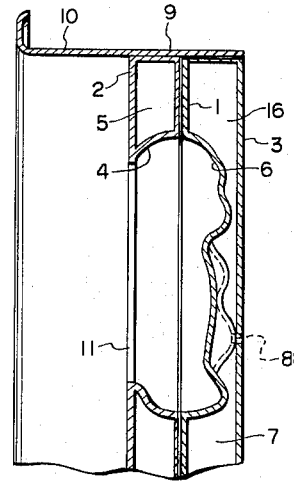
Figure 4:
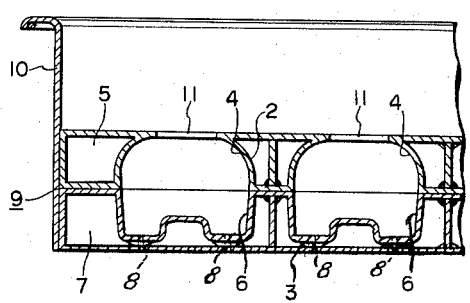

In the accompanying drawings which illustrate two embodiments of this invention: FIG. 1 is an overall plan of one embodiment; FIG. 2 is a side elevation thereof; FIG. 3 is an enlarged partial plan view; FIG. 4 is a sectional view on line IV—IV of FIG. 3; FIG. 5 is a sectional view on line V—V of FIG. 3; and FIG. 6 is a sectional view on line VI—VI of FIG. 7, FIG. 7 is a plan view of the other embodiment, and FIG. 8 is a front elevation view of FIG. 1.

In a first embodiment of this invention, shown in FIGS. 1–5, a mold proper is indicated at 1. Mold 1 includes two mold parts, namely an upper part 2 and a lower part 3. Each mold part is formed with a plurality of partial cavities, with each partial cavity being co-operable with a mating partial cavity in the other mold part to form a complete mold cavity. Thus, the upper mold part 2 is formed with a partial cavity defined by downwardly concave walls 4 so that the resultant partial mold cavity has a relatively large lower opening and a relatively smaller upper opening 11. The lower mold part 3 is formed with upwardly opening cavities defined by walls 6 and each having an upper opening substantially congruent with the lower opening of a mating partial mold cavity defined by walls 4. The particular contours and configurations of the partial mold cavities may be as desired in accordance with the desired form of article to be molded. The upper mold part 2 has a chamber 5 formed therein, partially defined by the outer surface of the wall 4, and lower mold part 3 has a cavity or chamber 7 therein surrounding the exterior surface of the wall 6. Each partial mold cavity 6 is formed with a vent 8 at its lower part, and vents 8 communicate with the exterior.

Mould-parts 2 and 3 which are substantially rectangular in plan, are inserted in an outer frame 9 which has a frame edge 10 extending upwardly from mould-part 2 and inlet openings 11 are formed on the upper surface of the upper mould-part 2 for each partial mold cavity. In addition, the mould-parts 2, 3, are provided with inlets 12 and 13, respectively as well as outlets openings 14 and 15, as is well-known, for passing a low temperature medium, for instance, cold brine. Inlets 13, and outlet 14 extend outwardly through downwardly opening notches in frame 9 and are removable from the frame along with mold section 3. Moreover, in each mould-part 2 or 3, flow directly baffles 16 are appropriately provided in order to circulate both brines along a round-about route. Further, an overflowing opening for excess material is indicated at 17.

In the above-mentioned construction, initially when the material undergoing refrigeration (for instance, ice-cream mixture) is charged within said frame 9, with matching mould-parts 2 and 3 superposed, said charged material flows into each mould cavity formed by the respective partial cavities 4, 6, through each inlet opening 11, until the whole mould-cavity is filled with the material. Then, the remaining material flows out through overflow opening 17. Then, cold brine is circulated into each chamber 5, 7 through inlets 12, 13, and said cold brine passes respectively to the outlets 14, 15 after being circulated along a round-about route by means of the conducting baffles 16, while material in each mould-cavity is solidified.

After a predetermined degree of freezing, hot brine is circulated into the chamber 7 through the inlet 13, and, as the portion of frozen material directly in contact with the wall of each mould cavity 6 begins to dissolve and soften, the lower mould-part 3 is then displaced downward to detach only the mould part 3 from the frozen material still remaining in the upper mould-part 2. Thereupon, if hot brine is circulated into the chamber 5 through the inlet 12, the frozen material will be detached from the mould-part 2 and dropped by reason of the softening of the frozen material in contact with the walls 4. In this instance, the frozen stock drops due to its own weight, but if necessary, outside force may be applied by using a pushing bar or the like inserted through opening 11.

The second example of the embodiment of this invention illustrates a case of forming an ice-cream, i.e. cold cake imitating a banana's configuration, wherein the mould proper 21 comprises upper and lower mould-parts 22 and 23 which are separable from one another. The upper mould-part 22 is provided with a number of mould-cavities 24, each having an inner surface corresponding to the body portion of a banana. The mould-part 22 is provided with a chamber 25 to surround mould-cavities 24. On the other hand, the lower mould-part 23 is provided with a number of mould-cavities 26, each corresponding to the remaining body portion of the bananas and the mould-part 23 is provided with a chamber 27 to surround mould-cavities 26. At the lower end of each mould-activity 26, a vent hole 28 is provided to communicate mould cavities 26 to the outside. Chambers 25 and 27 have inlets and outlets for brine, in the same manner as shown in FIGS. 1–5.

In this embodiment, material to be frozen such as ice-cream mixture is respectively poured into different mould-cavities 24, 26 with both mould-parts 22, 23 being united, and then the material in the mould-cavities 24, 26 is solidified or frozen by circulating cold brine through the chambers 25 and 27. As soon as the freezing has reached the desired degree, hot brine is circulated through chamber 27 to soften that portion of the material in contact with the walls of cavities 26. Then mould part 23 is displaced in a direction longitudinally of mould cavities 26, or downwardly. The mold part 23 thus becomes separated from the frozen material which is retained in the mould cavities 24 and extends downwardly therefrom. Hot brine is then circulated through the chamber 25, resulting in softening of the frozen material in contact with the walls of mould cavities 24, so that the frozen material slides out of the mould cavities 24. In this embodiment of the invention, frozen articles having the general shape and contours of a banana may be formed with high efficiency and with pleasing appearance.

In both embodiments of the invention, sticks may be inserted into the material before freezing, if desired.

In all the embodiments referred to above, ice-cakes, particularly ice-cream, are described as to manufacture. In practice, however, the process according to this invention may also be applied to the preparation of other freeze-moulded foods, for instance, chocolate, jelly cakes and the like. In such cases, in place of the above-mentioned cold and hot brines, cooling and heating fluids may be employed.

I claim:
1. Moulding process for foodstuffs hardenable by temperature reduction comprising the steps of charging fluid foodstuff material to be solidified into a plurality of mould cavities distributed in mutually separable upper and lower mould sections with each section having partial mould cavities mating with partial mold cavities in the other section, and with said sections joined together; circulating a refrigerant through chambers surrounding the partial mould cavities in both mould sections to cool the mould cavities to solidify the foodstuff material; after a predetermined degree of solidification has been attained, interrupting such circulation of refrigerant and then circulating a heating fluid through the chamber in the lower mould section to soften that portion of the solidified material in contact with the surface of the partial mould cavities in the lower mould section; lowering the thus released lower mould section to leave the solidified food material retained in the partial mould cavities of the upper section; and thereafter circulating a heating fluid through the chambers of the upper mould section to soften the solidified foodstuff material in surface contact with the partial mould cavities of the upper section for release of the solidified articles from the upper section.

2. Moulding process for ice cream comprising the steps of charging ice cream mix into a plurality of mould cavities having a predetermined configuration and distributed in mutually separable upper and lower mould sections with each mould section having a plurality of partial mould cavities mating with partial mould cavities in the other section, and while the two mould sections are united; circulating a refrigerant through chambers surrounding the mould cavities in each mould section for solidifying the ice cream mix; after the ice cream mix has attained a predetermined degree of solidification, interrupting such circulation of the refrigerant; circulating a heating fluid through the chambers in the lower mould section to soften the ice cream in surface contact with the partial mould cavities thereof; displacing the lower mould section downwardly from the upper mould section to leave the formed ice cream articles retained in the partial mould cavities of the upper mould section; and then circulating a heating fluid through the chambers in the upper mould section to soften the ice cream in contact with the surfaces of the partial mould cavities of the upper mould section to release the formed articles from the upper mould section.

3. Moulding process for chocolate comprising the steps of charging fluid chocolate to be solidified into a plurality of mould cavities having a preselected configuration and distributed in mutually separable upper and lower mould sections with each section having partial mould cavities mating with partial mould cavities in the other section, and while the mould sections are united; circulating a refrigerant through the chambers surrounding the mould cavities in both sections to solidify the chocolate; after attainment of a predetermined degree of solidification, interrupting such circulation of refrigerant; circulating a heating fluid through the chamber of the lower mould section to soften the chocolate in surface contact with the partial mould cavities thereof; displacing the lower mould section downwardly relative to the upper mould section to leave the moulded articles retained in the partial mould cavities of the upper section; and then circulating a heating fluid through the chamber of the upper mould section to soften the solidified chocolate in surface contact with the walls of the partial mould cavities in the upper section to release the formed articles from the upper mould section.

References Cited by the Examiner

UNITED STATES PATENTS

| 211,859 | 2/1879 | Manley | 99—436 |
| 651,963 | 6/1900 | Butler | 62—73 |
| 1,617,564 | 2/1927 | Becker | 107—8.5 |
| 1,833,502 | 11/1931 | Strunk. | |
| 2,159,338 | 5/1939 | Murphy | 107—54.45 |

WALTER A. SCHEEL, *Primary Examiner.*

JOSEPH D. BEIN, WILLIAM B. PENN, *Examiners.*